UNITED STATES PATENT OFFICE.

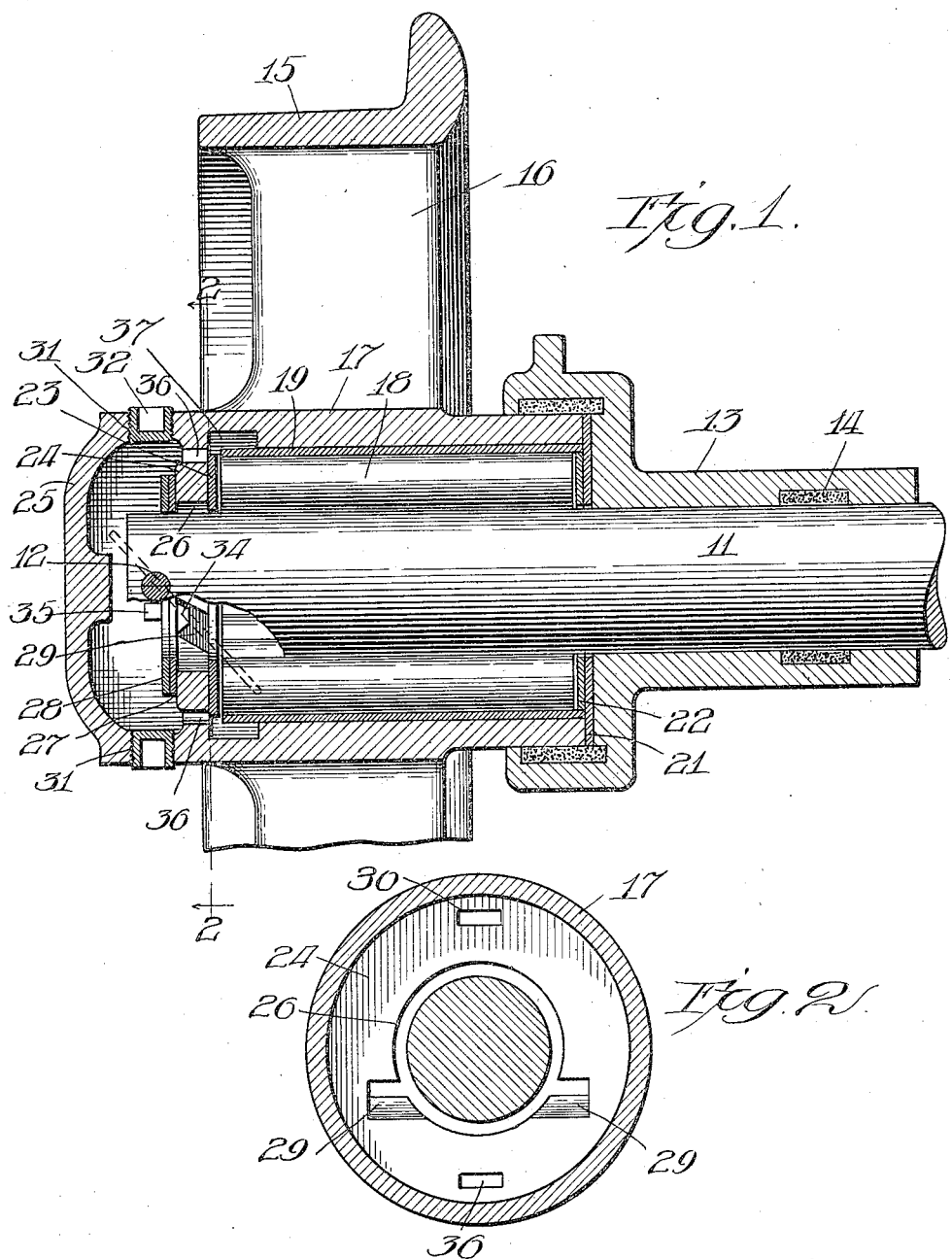

EZRA B. MEAD, OF OTTUMWA, IOWA, ASSIGNOR TO OTTUMWA IRON WORKS, OF OTTUMWA, IOWA, A CORPORATION OF IOWA.

WHEEL.

1,281,188.  Specification of Letters Patent.  Patented Oct. 8, 1918.

Application filed August 17, 1918. Serial No. 250,360.

*To all whom it may concern:*

Be it known that I, EZRA B. MEAD, a citizen of the United States, residing in Ottumwa, in the county of Wapello and State of Iowa, have invented a new and useful Improvement in Wheels, of which the following is a specification.

This invention relates in general to wheels and more particularly to wheels for heavy use, as for example wheels for mine cars, trucks, lumber buggies and the like, although it will be manifest as the invention is better understood that it has other and more general use.

Prior to my invention it has been generally the custom in certain classes of vehicles to provide a wheel having a hub closed at the outer end and having inwardly of this outer closure a lubricator chamber into which the end of the axle extends and arranged alongside the main portion of the hub in which the load bearings are provided. Sometimes this lubricator chamber has been provided by placing a cap over the end of the axle and securing it with suitable bolts or other fastening means to the remainder of the hub or to the body of the wheel. Not infrequently also it has been provided by merely casting the hub in one piece, a suitable core being employed to define the lubricator chamber through the provision of a partition extending inwardly and located at a proper distance from the end of the hub. The axle in each instance extends not only through the main part of the hub but also into the lubricator chamber where it is embraced by one or more washers and secured against its withdrawal from the wheel by a cotter pin or similar member engaging the end of the axle. The first of the structures mentioned is of course very greatly more expensive than the second and is attended with important disadvantages in that a tight joint between the cap and wheel body as a permanent provision is difficult to attain and in that the holding bolts tend to work loose and such structure requires constant inspection and attention and also not infrequent repair and replacement. Moreover, the bolt heads or nuts extend out forming projections on the cap likely to catch on exterior objects. The second structure requires that one or more washers be provided in the core and when the casting of the integral hub is completed the heat felt by the washer anneals it and greatly reduces the wearing qualities. By reason of this construction the wearing or deformation of a washer necessitates the immediate scrapping of the entire wheel since it is impossible to insert a new washer in the wheels constructed prior to my invention.

My present invention has for a principal object the provision of a wheel having a dust-proof, non-leaking integral lubricating chamber in the end of the hub into which washers may be inserted and removed and this after the hub is completed.

My invention has also an important object in the provision of a chilled or a hardened washer in such an integral chamber.

The invention also proposes to provide for the reduction of friction and wear of the parts within the lubricating chamber and this by confining the relative movement of the several parts between surfaces relatively smooth and frictionless and carried by parts readily removable and replaceable, so that should wear occur after a period of time renewal is possible without reformation of the entire wheel or expensive wheel parts.

Numerous other objects and advantages of the invention will be apparent as it is better understood from the following description when considered in connection with the accompanying drawing illustrating a preferred embodiment thereof.

On the drawing,

Figure 1 is a vertical section through a wheel embodying my present invention and showing the same in place upon the axle of a truck; and Fig. 2 is a section taken substantially on the line 2—2 of Fig. 1.

For the purpose of illustrating my invention I have shown on the drawing an axle 11 of the floating type adapted to receive through a suitable opening in its end a cotter pin 12. This axle is disposed through a box 13 which may be secured to the truck body or to the running gear, suitable felt packing 14 being provided to prevent leakage of lubricant back along the axle. The wheel in the present instance comprises a flanged rim or felly 15 preferably of chilled iron or steel on its outer surface and connected by spokes 16 with a hub 17. This hub is disposed about the axle, being carried therein in the present instance by an anti-friction bearing 18 of any suitable or preferred construction. As shown, however, this bearing in the present instance consists of rollers mounted in a suitable sleeve 19 and spaced from the box 13 by a washer 21 extending between the end of the hub and the box, and a second washer 22 disposed within the sleeve 19 and between the ends of the rollers and the washer 22. At the opposite ends of the rollers is located a washer 23 separating the rollers from a partition 24 cast in the hub. The end of the hub is closed by an imperforate end wall 25 located outwardly of the partition 24. This partition and the portion of the hub beyond it form an integral chamber beyond the bearings for the containing of a lubricant. The partition has an opening 26 through it of larger diameter than the axle and through the opening 26 the axle extends. The part of the axle located in the chamber is embraced by a plurality of washers or by a single washer, two being the at present desired number. These are indicated by the reference characters 27 and 28 and they may be inserted after the hub and wheel are completely formed. To make this possible I provide two angular or inclined slots 29 located in a side of the partition (on the same side of a diameter) and extending in an inclined direction toward said diameter. The washers are positioned through these inclined slots in a diagonal or inclined direction into the chamber and from the side of the hub into which the axle is inserted. The two washers are preferably inserted singly and after they have been positioned the shaft is put in place.

Upon diametrically opposite points two openings 31 are provided through the placing wall of the chamber and in the assembling of the wheel structure these openings provide access to permit threading the washers over the end of the axle. They also provide for the insertion of the cotter pin 12 and for spreading the legs. The openings are adapted to be closed by counter sunk threaded plugs 32 which preferably screw down tightly to a position almost flush with the outer surface of the hub. In order that the wear may be cut down I provide means for localizing relative movement of the parts in contact between the adjacent faces of the two washers 27 and 28. This means in the present instance consists of a lug 34 on the washer 27, which engages in one of the slots causing this washer to rotate with the hub; and a lug 35 upon the washer 28, which engages the cotter pin and prevents any relative rotation between the cotter pin and the washer 28. The washers are preferably chill hardened and have smooth engaging faces, so that little wear occurs as a result of this arrangement and there is practically no tendency to damage either the cotter pin or the adjacent face of the partition through the action of the parts in service.

Additional lubricating slots 36 are provided for conducting lubricant from the chamber to the bearing.

The wheel is preferably constructed by casting the hub spokes and rims as a complete integral structure, a suitable core being provided to define the main interior part of the hub, the chamber and the communicating openings between the chamber and the hub. The washers 27 and 28 are then singly inserted, the washer 28 in advance of the washer 27. The roller bearing parts and the shaft are then positioned with the washers embracing the ends of the shaft and closing the opening 26. The cotter pin may now be inserted, its legs spread and the plugs 32 screwed down. It will be manifest that the washers can be removed by reversing this assembling operation and one or more new washers substituted.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The combination of a wheel hub of cast ferric metal providing an integral closed chamber into which an end of an axle may extend, a plurality of chilled washers of wrought ferric metal within said chamber for embracing said axle, and means for fastening said washers on said axle.

2. The combination of a main wheel hub portion and a hub portion forming a permanently integral lubricating chamber into which the end of the axle may extend and a plurality of washers for embracing the axle disposed in said chamber and successively inserted therein after the hub is formed.

3. The combination of a wheel hub having a lubricating chamber at one end and adapted to receive the axle through the other, and a plurality of washers successively insertible into said chamber from the axle receiving end of said hub.

4. The combination of a wheel hub having a chamber at an end into which an end of an axle may extend, and a washer within the chamber for embracing said axle, said washer being locked for rotation with the hub.

5. The combination of a wheel hub having a chamber at an end into which an end of an axle may extend, and a pair of washers within the chamber for embracing said axle, one of said washers being locked against rotation independently of the axle and rotatable with respect to the other washer.

6. The combination of a wheel hub having a chamber at one end into which an end of an axle may extend, and a plurality of washers within the chamber for embracing said axle, one of said washers being locked against rotation independently of the hub and another against rotation independently of the axle.

7. The combination of a wheel hub closed at its outer end and having a partition providing a lubricating chamber adjacent said end, said partition having angular slots through which one or more washers may be passed into the lubricating chamber, and one or more washers.

8. The combination of a wheel hub closed at its outer end and having a partition providing a lubricating chamber adjacent said end, said partition having angular slots through which one or more washers may be passed into the lubricating chamber, said slots being located upon a single side of the diameter, and one or more washers.

9. The combination of a wheel hub having a chamber at an end into which an axle may extend and set off by a partition from the body of the hub, said partition being slotted, and a washer insertible through the slot of said partition into said chamber and having a part coöperating with the slots for holding said washer against rotation independently of the hub.

10. The combination of a hub providing a chamber for containing lubricant, into which an end of an axle may extend, said hub having slots through which a washer may pass into said chamber, and a washer arrangeable upon the end of an axle within the chamber and closing said slot.

11. The combination of a wheel hub providing an integral closed chamber into which the end of an axle may extend, and a plurality of washers successively insertible into and successively removable from said chamber.

12. The combination of an integral wheel hub closed at its outer end and divided internally into an end chamber into which an end of an axle may extend and a bearing chamber, a bearing sleeve in the bearing chamber, and a washer insertible through the bearing sleeve while in place in the bearing chamber and into the end chamber and adapted thereafter to embrace the end of the shaft.

EZRA B. MEAD.

Copies of this patent may be obtained for five cents each, by addressing the "Commissioner of Patents, Washington, D. C."